US008903364B2

United States Patent
Abraham et al.

(10) Patent No.: US 8,903,364 B2
(45) Date of Patent: Dec. 2, 2014

(54) METHOD AND SYSTEM FOR PROCESSING AND DELIVERY OF MULTIMEDIA CONTENT BY AN INTEGRATED FEMTOCELL AND SET-TOP-BOX DEVICE

(75) Inventors: Charles Abraham, Los Gatos, CA (US); Xuemin Sherman Chen, Rancho Santa Fe, CA (US); Wael William Diab, San Francisco, CA (US); Vinko Erceg, Cardiff, CA (US); Victor T. Hou, La Jolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 894 days.

(21) Appl. No.: 12/355,413

(22) Filed: Jan. 16, 2009

(65) Prior Publication Data

US 2010/0184414 A1  Jul. 22, 2010

(51) Int. Cl.
*H04M 3/42* (2006.01)
*H04L 29/06* (2006.01)
*H04W 88/18* (2009.01)
*H04W 84/04* (2009.01)

(52) U.S. Cl.
CPC .......... *H04L 65/601* (2013.01); *H04W 88/182* (2013.01); *H04L 69/24* (2013.01); *H04W 84/045* (2013.01)
USPC .................. 455/414.2; 455/414.3; 455/414.4; 455/419; 455/115.3; 455/115.4

(58) Field of Classification Search
CPC ........................................ H04H 60/04–60/54
USPC ............... 455/412.1–414.3; 725/39, 131, 151
See application file for complete search history.

(56) References Cited

U.S. PATENT DOCUMENTS

2005/0273824 A1* 12/2005 Matic .............................. 725/80
2006/0026302 A1*  2/2006 Bennett et al. ................ 709/246
(Continued)

FOREIGN PATENT DOCUMENTS

CN  101242483 A  8/2008
EP  1775935 A2  4/2007
(Continued)

OTHER PUBLICATIONS

Unpublished U.S. Appl. No. 12/391,009, filed Feb. 23, 2009.
(Continued)

*Primary Examiner* — Dai A Phuong
(74) *Attorney, Agent, or Firm* — Sterne, Kessler, Goldstein & Fox P.L.L.C.

(57) ABSTRACT

Aspects of a method and system for processing and delivery of multimedia content by an integrated femtocell and set-top-box device are provided. In this regard, a cellular enabled communication device may communicate its capabilities, preferences, and/or settings to an integrated femtocell and set-top-box device, wherein the integrated femtocell and set-top-box device may processes multimedia content for the cellular enabled communication device based on the capabilities, preferences, and/or settings of the cellular enabled communication device. Additionally, the cellular enabled communication device may receive the processed multimedia content from the integrated femtocell and set-top-box device by the cellular enabled communication device. The capabilities, preferences, and/or settings may comprise multimedia processing capabilities, preferences, and/or settings, communication capabilities, preferences, and/or settings, and/or power conditions, preferences, and/or settings. The integrated femtocell and set-top-box device may process the multimedia content to generate a plurality of subset datastreams.

30 Claims, 5 Drawing Sheets

(56) References Cited

U.S. PATENT DOCUMENTS

| | | | |
|---|---|---|---|
| 2006/0101497 A1* | 5/2006 | Hirt et al. | 725/81 |
| 2006/0209795 A1 | 9/2006 | Chow et al. | |
| 2007/0121655 A1 | 5/2007 | Jin | |
| 2008/0095173 A1* | 4/2008 | Bugenhagen | 370/395.21 |
| 2008/0216145 A1* | 9/2008 | Barton et al. | 725/131 |
| 2008/0225825 A1* | 9/2008 | Tsai et al. | 370/347 |
| 2008/0244148 A1 | 10/2008 | Nix, Jr. et al. | |
| 2008/0261514 A1* | 10/2008 | Pratt et al. | 455/3.06 |
| 2009/0028151 A1* | 1/2009 | Schmidt | 370/392 |
| 2009/0042536 A1 | 2/2009 | Bernard et al. | |
| 2009/0061873 A1 | 3/2009 | Bao et al. | |
| 2009/0156227 A1* | 6/2009 | Frerking et al. | 455/455 |
| 2009/0164547 A1 | 6/2009 | Ch'ng | |
| 2009/0279430 A1 | 11/2009 | Huber et al. | |
| 2009/0288144 A1 | 11/2009 | Huber et al. | |
| 2009/0292799 A1* | 11/2009 | Eisener et al. | 709/223 |
| 2009/0316649 A1 | 12/2009 | Chen | |
| 2010/0167734 A1* | 7/2010 | Jones et al. | 455/435.1 |
| 2010/0182991 A1 | 7/2010 | Abraham et al. | |
| 2010/0184411 A1 | 7/2010 | Chen et al. | |
| 2010/0184423 A1 | 7/2010 | Kent et al. | |
| 2010/0184450 A1 | 7/2010 | Chen et al. | |
| 2010/0186027 A1 | 7/2010 | Hou et al. | |
| 2010/0210239 A1 | 8/2010 | Karaoguz et al. | |
| 2010/0220642 A1 | 9/2010 | Abraham et al. | |
| 2010/0220692 A1 | 9/2010 | Diab et al. | |
| 2010/0220731 A1 | 9/2010 | Diab et al. | |
| 2010/0222054 A1 | 9/2010 | Abraham et al. | |
| 2010/0222069 A1 | 9/2010 | Abraham et al. | |
| 2010/0238836 A1 | 9/2010 | Diab et al. | |

FOREIGN PATENT DOCUMENTS

| | | |
|---|---|---|
| GB | 2381158 A | 4/2003 |
| WO | WO2005021022 | 3/2005 |
| WO | WO2005051022 A1 | 6/2006 |
| WO | 2007/000455 | 1/2007 |

OTHER PUBLICATIONS

Unpublished U.S. Appl. No. 12/395,470, filed Feb. 27, 2009.
Unpublished U.S. Appl. No. 12/395,410, filed Feb. 27, 2009.
Unpublished U.S. Appl. No. 12/395,383, filed Feb. 27, 2009.
Unpublished U.S. Appl. No. 12/395,313, filed Feb. 27, 2009.
Unpublished U.S. Appl. No. 12/395,436, filed Feb. 27, 2009.
Unpublished U.S. Appl. No. 12/406,835, filed Mar. 18, 2009.
European Search Report corresponding to European Patent Application No. 10001341.6-1244, dated Jul. 5, 2010.
English Abstract for Chinese Patent Publication No. CN 101242483A, published Aug. 13, 2008, from Espacenet, 1 page.
Etri et al., "TV Service in Home NodeB/eNodeB." 3GPP Draft, S1-082232, 3rd Generation Partnership Project (3GPP), Mobile Competence Centre, vol. SA WG1, Meeting #41, Jul. 21-25, 2008, p. 1-3, XP050228705, Sophia Antipolis, France.
Morihiko Tai et al., "Low Power Video Streaming for PDAs," Intenret Citation, [Online], Oct. 8, 2003, pp. 1-6, XP-002571114, Graduate of Information Science at Nara Institute of Science and Technology, Ikoma, Nara 630-0192, Japan.
European Search Report, Application No. 10000179.0-2413, May 20, 2010, pp. 1-4.

* cited by examiner

METHOD AND SYSTEM FOR PROCESSING AND DELIVERY OF MULTIMEDIA CONTENT BY AN INTEGRATED FEMTOCELL AND SET-TOP-BOX DEVICE

CROSS-REFERENCE TO RELATED APPLICATIONS/INCORPORATION BY REFERENCE

Not Applicable

FIELD OF THE INVENTION

Certain embodiments of the invention relate to communications. More specifically, certain embodiments of the invention relate to a method and system for processing and delivery of multimedia content by an integrated femtocell and set-top-box device.

BACKGROUND OF THE INVENTION

A femtocell may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas.

There are a plurality of design models for deployment and integration of femtocells, for example, an IP based lu-b interface, a session initiation protocol (SIP) based approach using an lu/A interface, use of unlicensed spectrum in a technique known as unlicensed mobile access (UMA) and/or use of IP multimedia subsystem (IMS) voice call continuity (VCC), for example.

In an lu-b model based femtocell deployment approach, femtocells may be fully integrated into the wireless carrier's network and may be treated like any other remote node in a network. The lu-b protocol may have a plurality of responsibilities, such as the management of common channels, common resources, and radio links along with configuration management, including cell configuration management, measurement handling and control, time division duplex (TDD) synchronization, and/or error reporting, for example. In lu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for processing and delivery of multimedia content by an integrated femtocell and set-top-box device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for processing and delivery of multimedia content by an integrated femtocell and set-top-box device. In various exemplary embodiments of the invention, a cellular enabled communication device may communicate its capabilities to an integrated femtocell and set-top-box device, wherein the integrated femtocell and set-top-box device may processes multimedia content for the cellular enabled communication device based on the capabilities of the cellular enabled communication device. Additionally, the cellular enabled communication device may receive the processed multimedia content from the integrated femtocell and set-top-box device by the cellular enabled communication device. The capabilities may comprise multimedia processing capabilities, communication capabilities, and/or power conditions. The cellular enabled communication device may store the multimedia content and present the multimedia content to a user. Multimedia processing capabilities may be determined based on a hardware and/or software codec within the cellular enabled communication device. Communication capabilities may be determined based on a minimum and/or maximum data rate at which the cellular enabled communication device may be operable to communicate. The integrated femtocell and set-top-box device may be operable to convert the multimedia content to a format suitable for the cellular enabled communication device. The integrated femtocell and set-top-box device may process the multimedia content to generate a plurality of subset datastreams. One or more subset datastreams may be communicated to the cellular enabled communication device based on the determined capabilities. The integrated femtocell and set-top-box device may determine error coding to utilize for processing and communicating the multimedia content to the cellular enabled communication device based on the determined capabilities.

Figure 1A:
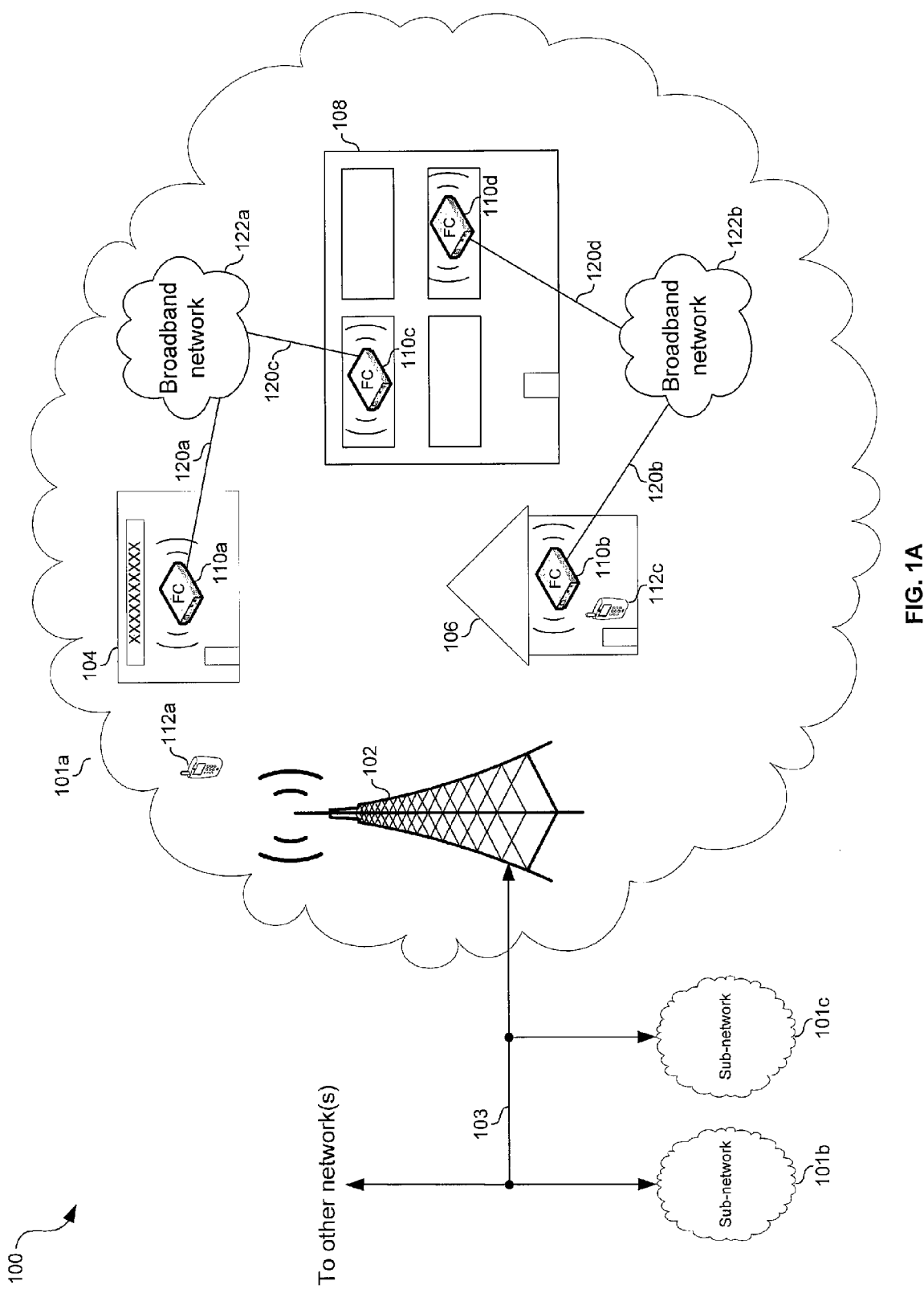
FIG. 1A is a diagram illustrating an exemplary cellular network, in accordance with an embodiment of the invention.

FIG. 1A is a diagram illustrating an exemplary cellular network, in accordance with an embodiment of the invention. Referring to FIG. 1A, there is shown a cellular network 100 comprising sub-networks 101a-101c. The exemplary sub-network 101a may comprise a base station 102, integrated femtocell and set-top-box (IFSTB) devices 110a-110d, which are collectively referred to herein as IFSTB devices 110, and cellular enabled communication devices 112a and 112c, which are collectively referred to herein as cellular enabled communication devices 112. The IFSTB devices 110 may be installed in one or more commercial properties 104, one or more residential properties 106, and/or one or more multi-tenant properties 108.

The networks 122a and 122b, collectively referred to herein as networks 122, may comprise, for example, satellite networks, cable networks, DVB networks, the Internet, or similar local or wide area networks, which are capable of conveying data which may comprise multimedia. The broadband connections 120a-120d, collectively referred to herein as broadband connections 120, may comprise optical, wired, and/or wireless links.

The commercial properties 104 may comprise, for example, stores, restaurants, offices, and municipal buildings. The residential properties 106 may comprise, for example, single-family homes, home offices, and/or town-houses. Multi-tenant properties 108 may comprise, for example, residential and/or commercial tenants such as apartments, condos, hotels, and/or high rises. One or more of the commercial properties 104, residential properties 106, and/or multi-tenant properties 108 may comprise computing and/or multimedia networks which may comprise a set-top-box with integrated femtocell functionality.

The base station 102 may be operable to communicate data wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. "Data," as utilized herein, may refer to any analog and/or digital information including but not limited to voice, Internet data, and/or multimedia. Multimedia may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecommunications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul connections 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The IFSTB devices 110 may be operable to perform one or more functions of a femtocell. In this regard, the IFSTB devices 110 may each comprise suitable logic, circuitry, and/or code that may be operable to process and/or communicate data adhering to one or more cellular standards such as IS-95, CDMA, GSM, TDMA, GPRS, EDGE, UMTS/WCDMA, TD-SCDMA, HSDPA, extensions thereto, and/or variants thereof. In this regard, the IFSTB devices 110 may each communicate with cellular enabled communication devices such as the cellular enabled communication devices 112. Exemplary cellular standards supported by the IFSTB devices 110 may be specified in the International Mobile Telecomunnications-2000 (IMT-2000) standard and/or developed by the $3^{rd}$ generation partnership project (3GPP) and/or the $3^{rd}$ generation partnership project 2 (3GPP2).

The IFSTB devices 110 may be operable to perform one or more functions of a set-top-box. In this regard, the IFSTB devices 110 each comprise suitable logic, circuitry, and/or code that may be operable to transmit and/or receive data via a broadband network 122. Additionally, the IFSTB devices 110, may each comprise suitable logic, circuitry, and/or code that may be operable to encrypt, decrypt, compress, decompress, encode, decode, transcode, present, scramble, descramble, or otherwise process multimedia content. In this regard, the IFSTB devices 110 may each be operable to output multimedia content to one or more multimedia devices such as monitors, speakers, and/or storage devices via one or more multimedia connections.

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication devices may comprise laptop computers, mobile phones, and personal media players. The cellular enabled communication devices 112 may be enabled to receive, process, and present multimedia content and may additionally be enabled run a web browser or other applications for providing Internet services to a user of the cellular enabled communication device 112. In various embodiments of the invention, any of the cellular enabled communication devices 112 may be operable to communicate their data processing and/or communication capabilities, preferences, and/or settings to any of the IFSTB devices 110 with which they have established one or more cellular communications channels.

In operation, any of the IFSTB devices 110 may be operable to determine capabilities, preferences, and/or settings of any of the cellular enabled communication devices 112 with which they have established one or more cellular communications channels. Furthermore, the IFSTB devices 110 may be operable to process and/or transmit multimedia content based on the determined capabilities, preferences, and/or settings.

Additionally, the IFSTB devices 110 may provide network connectivity to one or more multimedia devices via one or more multimedia interfaces, such as HDMI or DisplayPort, and/or via one or more I/O interfaces such USB and/or IEEE 1394. In this regard, each of the IFSTB devices 110 may be communicatively coupled to one or more broadband networks 122 via a broadband connection 120 and may be operable to receive multimedia content from a broadband network 122 and deliver the content to cellular enabled communication devices, multimedia devices, and/or other communication devices.

In instances that a cellular enabled communication device 112 receives multimedia content from one or more of the IFSTB devices 110, the format and/or type of content transmitted by the one or more IFSTB devices 110 may be based on determined capabilities, preferences, and/or settings of the cellular communication device 112. In this regard, the cellular communication devices 112 may each communicate their multimedia processing and/or communication capabilities, preferences, and/or settings to the IFSTB devices 110. Exemplary capabilities, preferences, and/or settings which may be communicated comprise, supported and/or preferred data rates, a type of hardware and/or software coder and/or decoder (CODEC) utilized to process the multimedia, power available for receiving and/or processing multimedia content, processor time available for processing multimedia, supported and/or preferred audio and/or video formats, and supported and/or preferred audio and/or video resolutions. Additionally, characteristics of the cellular communication channel(s) between the IFSTB devices 110 and the cellular enabled communication devices 112 may be determined and the processing and/or delivering of the multimedia content may depend on those characteristics. In this regard, characteristics such as maximum or available bandwidth of a channel may be determined and utilized for delivering multimedia content. Also, an error coding scheme utilized for reliably delivering the multimedia content may be determined based on the determined multimedia processing capabilities, preferences, and/or settings and/or characteristics of the cellular communication channel utilized to convey the multimedia content.

Figure 1B:
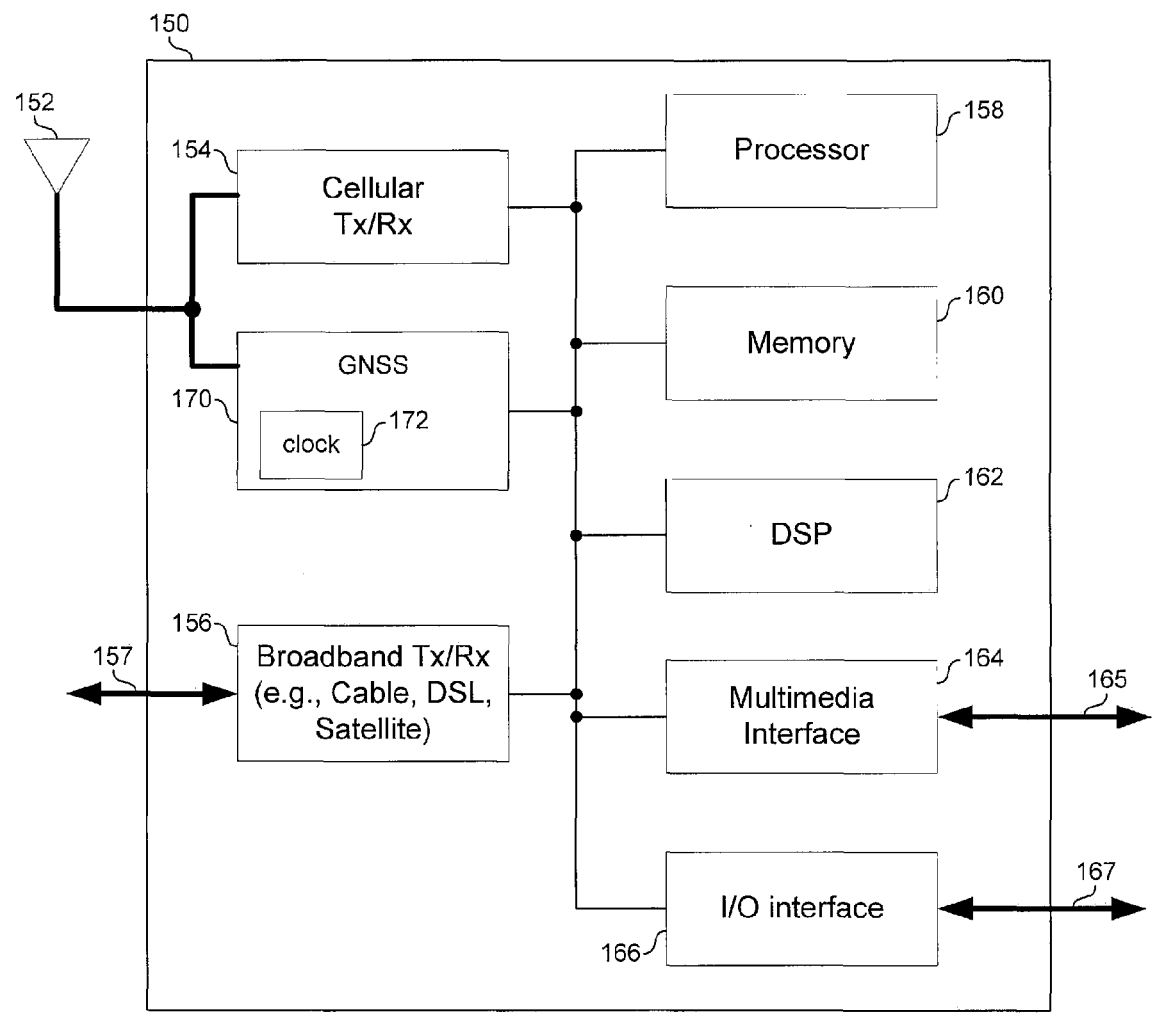
FIG. 1B is an exemplary block diagram of an integrated femtocell and set-top-box (IFSTB) device, in accordance with an embodiment of the invention.

FIG. 1B is an exemplary block diagram of an integrated femtocell and set-top-box (IFSTB) device, in accordance with an embodiment of the invention. Referring to FIG. 1B the IFSTB device 150 may comprise an antenna 152, a global navigation satellite system (GNSS) receiver (Rx) 170, a cellular transmitter and/or receiver (Tx/Rx) 154, a broadband transmitter and/or receiver (Tx/Rx) 156, a processor 158, a memory 160, a digital signal processor (DSP) 162, an multimedia interface 164, and an input and/or output (I/O) interface 166. The IFSTB device 150 may be similar to or the same as the IFSTB devices 110 of FIG. 1A.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception. Similarly, the cellular Tx/Rx 154 and the GNSS Rx 170 may share an antenna or may utilize different antennas.

The GNSS Rx 170 may comprise suitable logic, circuitry, and/or code that may be operable to receive and process signals from a GNSS system. Exemplary GNSS systems comprise the United State's global positioning system (GPS), Russia's GLONASS, and the European Union's Galileo. The GNSS Rx 170 may comprise a clock 172 and may be operable to maintain the accuracy of the clock 172 based on received GNSS signals. In various embodiments of the invention, the clock 172 may be utilized to synchronize and/or maintain operations of other portions of the IFSTB device 150. For example, content may be transmitted, decoded and/or presented based on the clock 172.

The cellular Tx/Rx 154 may comprise suitable logic circuitry and/or code that may be operable to transmit and/or receive data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA) and/or code division multiple access (CDMA). Exemplary cellular standards supported by the IFSTB device 150 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). In various embodiments of the invention, the cellular Tx/Rx 154 may characterize a channel over which it may transmit multimedia content. The characterization of the channel may be utilized to determine how to process and/or communicate the multimedia content.

The broadband Tx/Rx 156 may comprise suitable logic, circuitry, and/or code that may be operable to transmit data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive data over the broadband connection 157 which may comprise, for example, a T1/E1 line, optical fiber (e.g., xPON), DSL, cable television infrastructure, satellite broadband internet connection, satellite television infrastructure, and/or Ethernet. The broadband connection 157 may be similar to or the same as the broadband connections 120 described with respect to FIG. 1A.

The processor 158 may comprise suitable logic, circuitry, and/or code that may enable processing data and/or controlling operations of the IFSTB device 150. In this regard, the processor 158 may be enabled to provide control signals to the various other portions comprising the IFSTB device 150. The processor 158 may also control transfers of data between various portions of the IFSTB device 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the GNSS Rx 170, cellular Tx/Rx 154, the broadband Tx/Rx 156, the DSP 162, and/or the memory 160. In various embodiments of the invention, the processor 158 may be enabled to provide one or more signals to the cellular Tx/Rx 154, the memory 160, and/or the DSP 162 to control a manner in which multimedia content is processed and/or transmitted.

The memory 160 may comprise suitable logic, circuitry, and/or code that may enable storage or programming of information comprising parameters and/or code that may effectuate the operation of the IFSTB device 150. The memory 160 may comprise, for example, SRAM, DRAM, flash memory, and/or magnetic storage. The information may comprise received data and/or data to be presented, transmitted, and/or otherwise processed. In this regard, the memory 160 may store multimedia content and the IFSTB 150 may be operable to store and playback multimedia content and perform functions of a digital video recorder (DVR). The parameters may comprise configuration data and the code may comprise operational code such as software and/or firmware, but the information need not be limited in this regard. Moreover, the parameters may include adaptive filter and/or block coefficients. Additionally, the memory 160 may buffer or otherwise store multimedia content to be processed and/or processed multimedia content awaiting transmission.

The DSP 162 may comprise suitable logic, circuitry, and/or code operable to perform computationally intensive processing of data. In various embodiments of the invention, the DSP 162 may encode, decode, transcode, modulate, demodulate, encrypt, decrypt, scramble, descramble, and/or otherwise process multimedia content. In various embodiments of the invention, the DSP 162 may be enabled to adjust a modulation scheme, error coding scheme, and/or data rates of transmitted cellular signals comprising multimedia content.

The multimedia interface 164 may comprise suitable logic, circuitry, and/or code that may be operable to communicate multimedia content to one or more devices for presentation to a user. In this regard, multimedia content may be received via one or more of the cellular Tx/Rx 154, the broadband Tx/Rx 156, and/or the I/O interface 166. For example, the multimedia interface 164 may output analog and/or digital multimedia signals such as analog audio, composite video, analog RGB video, S-Video, component video, DVI, HDMI, and/or DisplayPort. In this regard, the multimedia interface 164 may be operable to up-convert, filter, modulate, and/or amplify multimedia signals. Accordingly, the multimedia connection(s) 165 may comprise one or more multimedia links suitable for conveying one or more of the multimedia standards supported by the multimedia interface 164.

The I/O interface 166 may comprise suitable logic, circuitry, and/or code that may be operable to exchange information in accordance with one or more communication standards. Exemplary communication standards supported by the I/O interface 166 may comprise USB, IEEE 1394, Wi-Fi, Wi-Max, infrared (IR), and/or Bluetooth. Accordingly, the I/O connection(s) 167 may comprise one or more optical, wired and/or wireless links suitable for conveying one or more of the communication standards supported by the I/O interface 166.

In operation, the IFSTB device 150 may receive multimedia content via one or more of the cellular Tx/Rx 154, the broadband Tx/Rx 156, the cellular Tx/Rx 154, the multimedia interface 164, and/or the I/O interface 166. In various exemplary embodiments of the invention, the multimedia content may be processed via the processor 158, the memory 160, and/or the DSP 162 and subsequently communicated to one or more cellular enabled communication devices via the cellular Tx/Rx 154. The manner in which the content is processed may be determined based on processing and/or communication capabilities, preferences, and/or settings of one or more cellular enabled communication devices to which the content may be delivered. In this regard, the one or more cellular enabled communication devices may transmit their capabilities, preferences, and/or settings to the IFSTB device 150 and may do so, for example, periodically or in response to a query from the IFSTB device 150. Additionally, the IFSTB device 150 may determine capabilities, preferences, and/or settings of the cellular enabled communication devices based on characteristics of one or more communication channels over which it communicates with the cellular enabled communication devices. Exemplary characteristics that the IFSTB device 150 may utilize to determine how to process and/or deliver multimedia content may comprise supported and/or preferred data rates, a type of hardware and/or software coder and/or decoder (CODEC) utilized to process the multimedia, power available for receiving and/or processing multimedia content, processor time available for processing multimedia, supported and/or preferred audio and/or video formats, supported and/or preferred audio and/or video resolutions.

In various embodiments of the invention, data received via the cellular Tx/Rx 154, the broadband Tx/Rx 156, the multimedia interface 164, and/or the I/O interface 166 may comprise control data which may be utilized to control operations and/or functionality of the femtocell 150. In this regard, the STB-FC may be controlled remotely from, for example, a portable device or a PC.

Figure 2:
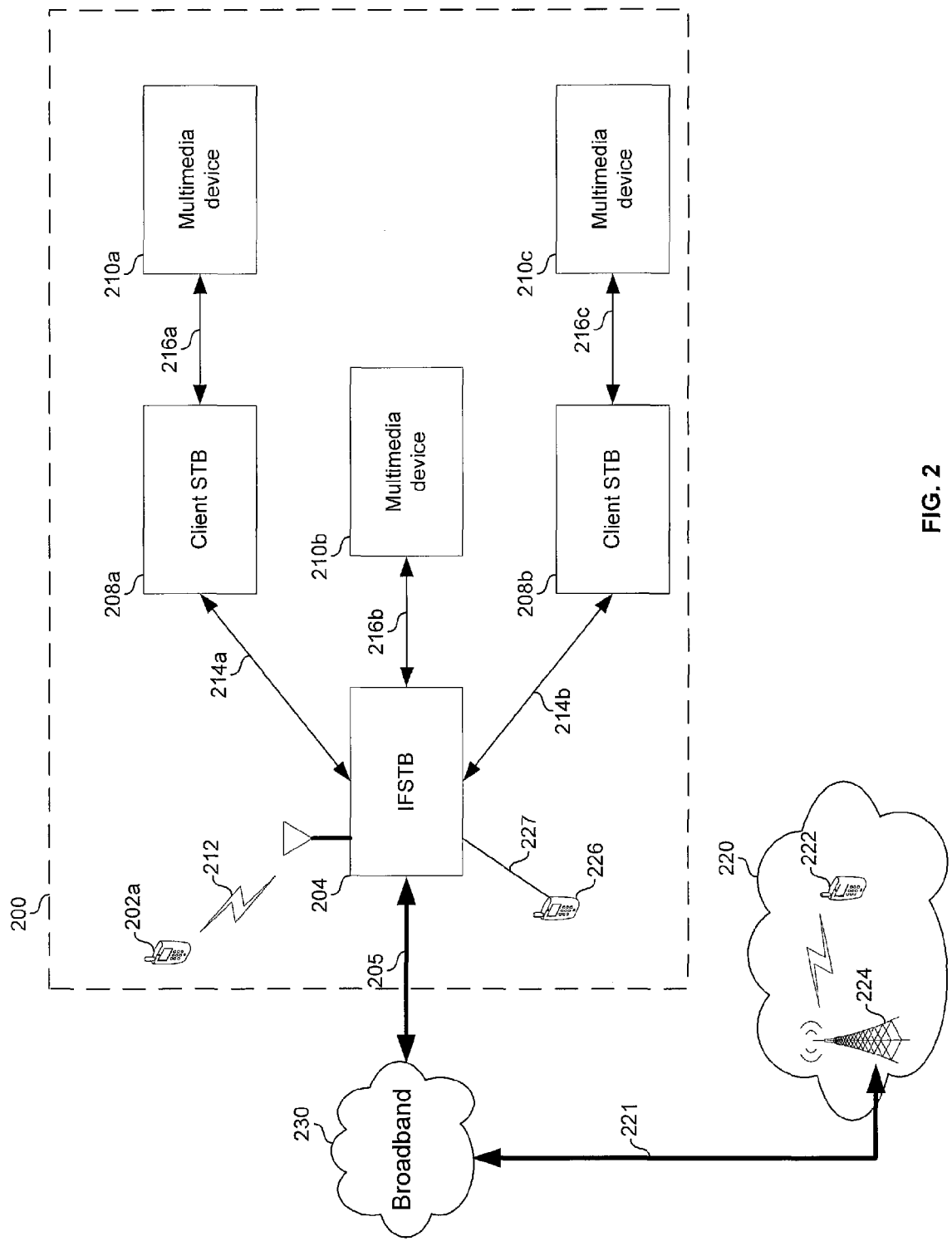
FIG. 2 is a diagram illustrating a multimedia network comprising integrated femtocell and set-top-box (IFSTB) device, in accordance with an embodiment of the invention.

FIG. 2 is a diagram of a multimedia network comprising an integrated femtocell and set-top-box (IFSTB) device, in accordance with an embodiment of the invention. Referring to FIG. 2, the multimedia network 200 may comprise a cellular enabled communication device 202, portable device 226, a IFSTB device 204, client set-top-boxes (STBS) 208a and 208b, which are collectively referred to herein as client STBs 208, and multimedia devices 210a, 210b, and 210c, which are collectively referred to herein as multimedia devices 210. The IFSTB device 204 may be communicatively coupled, via broadband connection 205, to a network 230, which may in turn be communicatively coupled, via backhaul connection 221, to a cellular network 220. In various embodiments of the invention, the network 230 may comprise a network, such as a cable television network, satellite television network, or the Internet, enabled to convey general data and/or multimedia. The IFSTB device 204 may be communicatively coupled to one or more client set-top-boxes (STBs) 208 via multimedia connections 214. The IFSTB device 204 may be communicatively coupled to one or more multimedia devices 210 via multimedia connections 216. The multimedia connections 214 and 216 may be similar to or the same as the multimedia connections 165 described with respect to FIG. 1B. The IFSTB device 204 may be communicatively coupled to one or more portable devices 226 via I/O connections 227 which may be similar to or the same as the I.O connection 167 described with respect to FIG. 1B.

The cellular network 220 may be similar to or the same as the cellular network 100 described with respect to FIG. 1A.

The network 230 may be similar to or the same as the broadband networks 122 described with respect to FIG. 1A.

The portable device 226 may comprise, for example, a cellular enabled communication device, a laptop computer, a personal data assistant, or a personal media player. The connection 227 to the portable device 226 may comprise, for example, an Ethernet, USB, or IEEE 1394 connection.

The cellular enabled communication device 202 may be similar to or the same as the cellular enabled communication devices 112 described with respect to FIG. 1A. In various embodiments of the invention, capabilities, preferences, and/or settings of the cellular enabled communication device 202 may be associated with or indicated by a user profile of the cellular enabled communication device 202. The user profile may comprise information such as active subscriptions, parental settings, and/or personal preferences. Also, the user profile may comprise security information such as certificates, passwords, and/or encryption keys. In this regard, permissions, features, and/or functionality of the cellular enabled communication device and/or one or more other communication devices 112 may be based on a user profile and the security information associated with the user profile may enable viewing and/or otherwise accessing multimedia content.

In an exemplary embodiment of the invention, an electronic programming guide (EPG) may be customized and delivered to a cellular enabled communication device based on capabilities, preferences, and/or settings of that cellular enabled communication device as indicated by its user profile. For example, channels, stations, and/or content in the EPG communicated to a cellular enabled communication device may be customized to the capabilities, preferences, and/or settings of that device. Additionally and/or alternatively, favorite channels, stations, and/or content associated with a user profile may be communicated by default and/or before non-favorite channels, stations, and/or content.

The backhaul connection 221 may convey data between the cellular network 220 and the network 230. In this regard, the backhaul connection 221 may comprise one or more optical, wired, and/or wireless backhaul links which communicatively couple the base station 224 to the network 230.

The broadband connection 205 may comprise one or more high bandwidth links that may be enabled to convey data. Exemplary broadband connections may comprise an Ethernet connection, a digital subscriber line (DSL), passive optical network (PON), a T1/E1 line, a cable television infrastructure, a satellite television infrastructure, and/or a satellite broadband Internet connection. The broadband connection 205 may comprise one or more optical, wired and/or wireless links. The broadband connection 205 may be similar to or the same as the broadband connections 120 described with respect to FIG. 1A.

The integrated femtocell and set-top-box (IFSTB) device 204 may comprise suitable logic, circuitry, and/or code that may be operable to receive data, transcode data, output data for presentation, store data, and/or transmit the data utilizing one or more interfaces and/or protocols. The IFSTB device 204 may be operable to transmit and/or receive data via cellular communication. The IFSTB device 204 may be operable to transmit and/or receive data via the broadband connection 205. The IFSTB device 204 may be operable to output multimedia to one or more multimedia devices 210. Processing of multimedia within the IFSTB device 204 may be based on a destination of the multimedia. In this regard, a manner in which multimedia is processed may be based on multimedia processing capabilities, preferences, and/or settings of the destination device and/or based on characteristics of a connection between the IFSTB 204 and the destination device.

In some embodiments of the invention, the permissions, features, and/or functionality of the IFSTB device 204, and thus services (e.g., Internet access) and/or multimedia content available to the network 200, may be configurable and may be determined based on one or more user profiles. Accordingly, a first set of services and/or multimedia content may be available to the network 200 for a first user profile and a second set of services and/or multimedia content may be available for a second user profile. The first user profile may be similar to or different from the second user profile. The profile may be persistent and may only need to be periodically updated. Alternatively, the user profile may only be valid while an associated or particular device is communicatively coupled to, or within range of, the IFSTB device 204. For example, user profiles may be stored on and/or associated with the cellular enabled communication device 202a and the portable device 226 and may be communicated to the IFSTB 204 via the connections 212 and 227, respectively.

The client STBs 208 may each comprise suitable logic, circuitry, and/or code that may be operable to receive multimedia content, process the multimedia content if necessary, and output the multimedia content to one or more multimedia devices 210. In some embodiments of the invention, the permissions, features, and/or functionality of the client STBs 208 may be configurable. In this manner, multimedia content that may be processed and/or presented by the client STBs 208 may be determined based on one or more user profiles. In some instances, the client STBs 208 may be physically the same as the IFSTB device 204 but may be configured differently than the IFSTB device 204. In some embodiments of the invention, one or more of the client STBs may comprise or may be communicatively coupled to a cellular enabled communication device. For example, one or more of the client STBs may be coupled via an I/O connection 227 to a cellular phone or broadband access card. In various embodiments of the invention, the format and/or types of multimedia content delivered to the client STBs 208 from the IFSTB device 204 may depend on the multimedia processing capabilities, preferences, and/or settings of the client STBs 208 and/or the multimedia connections 216 between the client STBs 208 and/or the IFSTB device 204. In various embodiments of the invention, the format and/or types of multimedia content delivered to the client STBs 208 from the IFSTB device 204 may depend on the multimedia processing capabilities, preferences, and/or settings of the multimedia devices 210 communicatively coupled to the client STBs 208. In this regard, the multimedia devices 210 may communicate their capabilities, preferences, and/or settings to the client STBs 208 which may in turn convey those capabilities, preferences, and/or settings to the IFSTB 204.

The multimedia devices 210 may comprise, for example, televisions, displays, stereo systems, and/or recording and/or playback devices. The multimedia devices 210 may be enabled to receive multimedia video content and present the content to a user. Additionally, the multimedia devices 210 may be enabled to store, playback, and/or retrieve from memory, data to be communicated to another device. In this regard, the data may be conveyed to the IFSTB device 204 for processing and/or conveyance to another device of the network 200 and/or via the multimedia connection 205. In various embodiments of the invention, the format and/or types of multimedia content delivered to the multimedia devices 210 may depend on the multimedia processing capabilities, preferences, and/or settings of the multimedia devices 210. In this regard, the multimedia devices 210 may communicate their capabilities, preferences, and/or settings to the client STBs 208 which may in turn convey those capabilities, preferences, and/or settings to the IFSTB 204.

In operation, the cellular enabled communication device 202 may enter cellular communication range of the IFSTB device 204. Subsequently, the cellular enabled communication device 202 may communicate its multimedia processing and/or communication capabilities, preferences, and/or settings to the IFSTB device 204 via one or more cellular communication channels 212. In some embodiments of the invention, these capabilities, preferences, and/or settings may be communicated as part of a user profile associated with the cellular enabled communication device. Upon receipt of the capabilities, preferences, and/or settings by the IFSTB device 204, the IFSTB device 204 may process multimedia content such that it is suitable for delivery to the cellular enabled communication device 202 via the cellular communication channel 212. In this regard, processing of the multimedia content may comprise, for example, encrypting, decrypting, compressing, decompressing, encoding, decoding, transcoding, presenting, scrambling, and/or descrambling the content. The IFSTB 204 may communicate the processed multimedia content to the cellular enabled communication device 202 via the cellular channel(s) 212.

In some embodiments of the invention, the IFSTB device 204 may be controlled remotely via data received over the IP network 230 and/or via a cellular communication channel such as the channel 212. For example, the cellular enabled communication device 222 may request an operation be performed by the network 200 by sending data to the IFSTB device 204 via the base station 224, the backhaul connection 221, the network 230, and the broadband connection 205. In some embodiments of the invention, the IFSTB device 204 may be controlled remotely by a wireless communication device utilizing cellular and/or other wireless protocol such as Bluetooth, wireless USB, UWB, 60 GHz, and/or ZigBee. The IFSTB device 204 may also be controlled locally by a wired connection such as the I/O connection 227 to the portable device 226. For example, the cellular enabled communication device 202 may effectively operate as a remote control of the IFSTB device 204.

Figure 3:
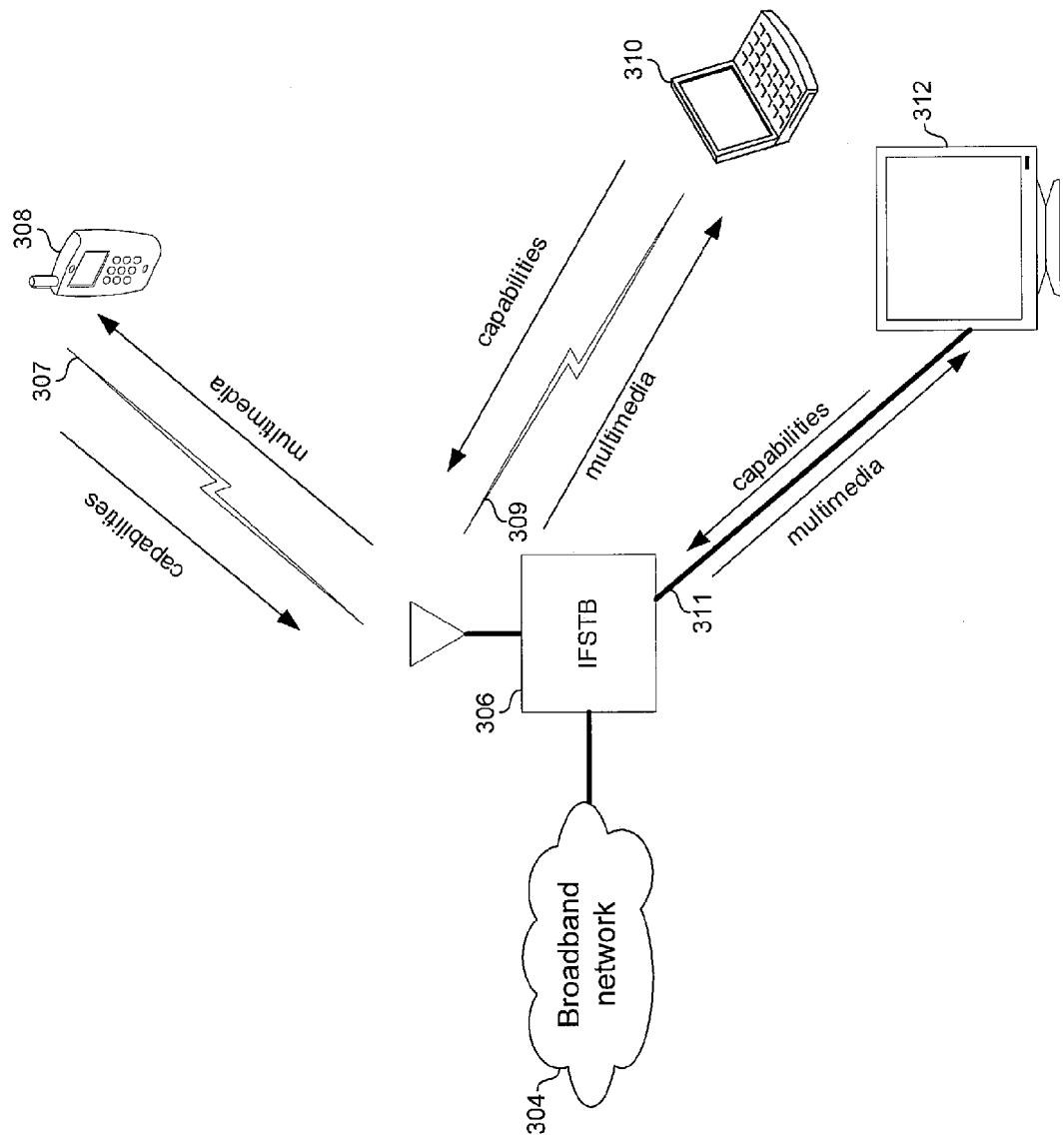
FIG. 3 is a diagram illustrating exchange of feedback to manage processing and delivery of multimedia content by an integrated femtocell and set-top-box (IFSTB) device, in accordance with an embodiment of the invention.

FIG. 3 is a diagram illustrating exchange of feedback to manage processing and delivery of multimedia content by an integrated femtocell and set-top-box (IFSTB) device, in accordance with an embodiment of the invention. Referring to FIG. 3, there is shown a broadband network 304, an IFSTB device 306, a cellular enabled communication device 308, a cellular enabled communication device 310, and a multimedia device 312.

The network 304 may be similar to or the same as the network 230 described with respect to FIG. 2. The IFSTB device 306 may be similar to or the same as the IFSTB device 150 described with respect to FIG. 1B. The cellular enabled communication devices 308 and 310 may be similar to or the same as the cellular enabled communication devices 112 described with respect to FIG. 1A. The multimedia device 312 may be similar to or the same as the multimedia devices 210 described with respect to FIG. 2.

In operation, the IFSTB device 306 may receive multimedia content from the broadband network 304, process the multimedia content, and communicate the processed multimedia content to the cellular enabled communication devices 308 and 310 and the multimedia device 312 via the connections 307, 309, and 311, respectively. The multimedia content delivered to the cellular enabled communication device 308 may depend on the capabilities, preferences, and/or settings of the cellular enabled communication device 308 and the cellular connection 307. The multimedia content delivered to the cellular enabled communication device 310 may depend on the capabilities, preferences, and/or settings of the cellular enabled communication device 310 and the cellular connection 309. The multimedia content delivered to the multimedia device 310 may depend on the capabilities, preferences, and/or settings of the multimedia device 310 and the multimedia connection 311.

Accordingly, each of the devices 308, 310, and 312 may communicate information about its multimedia processing capabilities, preferences, and/or settings to the IFSTB device 306. Exemplary information about multimedia processing capabilities, preferences, and/or settings may comprise a type of hardware and/or software coder and/or decoder (CODEC) utilized to process the multimedia, power available for processing multimedia content, processor time available for processing multimedia, supported and/or preferred audio and/or video formats, and supported and/or preferred audio and/or video resolutions. Additionally, each of the devices 308, 310, and 312 may communicate information about its communication capabilities, preferences, and/or settings to the IFSTB device 304. Exemplary information about multimedia processing capabilities, preferences, and/or settings may comprise a maximum data rate supported, available bandwidth, and power available for transmitting and/or receiving.

In various embodiments of the invention, the IFSTB device 306 may process the multimedia content to generate a scalable coded datastream comprising a plurality of subset datastreams. In this regard, a subset datastream may be generated by dropping information from the conventional datastream. For example, packets may be dropped from an MPEG datastream to generate a subset datastream. The subset datastream may have lower temporal resolution, spatial resolution, and/or quality compared to the original MPEG datastream. Subset datastreams delivered to the device 308 may be determined based on the connection 307 and based on multimedia processing capabilities, preferences, and/or settings of the device 308. Subset datastreams delivered to the device 310 may be determined based on the connection 309 and based on multimedia processing capabilities, preferences, and/or settings of the device 310. Subset datastreams delivered to the device 312 may be determined based on the connection 311 and based on multimedia processing capabilities, preferences, and/or settings of the device 312. In an exemplary embodiment of the invention, the device 308 may have low-end multimedia processing capabilities, the device 310 may have typical multimedia processing capabilities, and the multimedia device 312 may have advanced multimedia processing capabilities. Thus, three subset datastreams may be generated to support the three levels of capability. The first subset datastream may comprise reduced, for example, resolution, frame rate, and/or color depth compared to the original multimedia content received by the IFSTB 306. The second subset datastream may comprise, for example, additional data to increase the resolution, frame rate, and/or color depth. The third subset datastream may comprise, for example, additional data to increase the resolution, frame rate, and/or color depth. Accordingly, only a first of the subset datastreams may be communicated to the device 308, two of the three subset datastreams may be communicated to the device 310, and all three of the subset datastreams may be communicated to the device 312.

Figure 4:
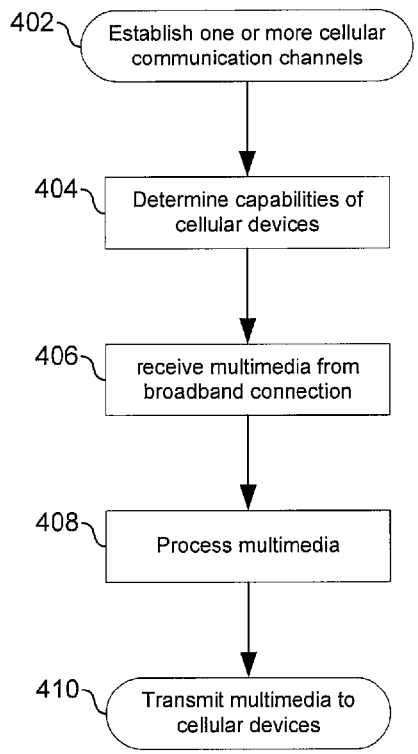
FIG. 4 is a flow chart illustrating exemplary steps for processing and delivery of multimedia content by an integrated femtocell and set-top-box (IFSTB) device, in accordance with an embodiment of the invention.

FIG. 4 is a flow chart illustrating exemplary steps for processing and delivery of multimedia content by an integrated femtocell and set-top-box (IFSTB) device, in accordance with an embodiment of the invention. Referring to FIG. 4, the exemplary steps may begin with step 402 when one or more cellular communication channels are established between an IFSTB device, such as the device 150 of FIG. 1B, and a cellular enabled communication device, such as the device 112 of FIG. 1A. Subsequent to step 402, the exemplary steps may advance to step 404. In step 404, the IFSTB device may determine the multimedia processing and/or communication capabilities, preferences, and/or settings of the cellular enabled communication device. Subsequent to step 404, the exemplary steps may advance to step 406. In step 406, the IFSTB may receive multimedia content via a broadband connection, such as the connection 157 of FIG. 1B. In an exemplary embodiment of the invention, the multimedia content may comprise high definition video and high quality multi-channel audio. Subsequent to step 406, the exemplary steps may advance to step 408. In step 408, the IFSTB device may process the received multimedia content based on one or more devices, such as the devices 308, 310, and 312 of FIG. 3, to which the content is to be delivered. In this regard, for devices that may be unable to handle HD video, parameters such as resolution, frame rate, compression, and/or color depth of the processed content may be adjusted prior to delivery to the device. Similarly, for devices that may be unable to handle high-quality multi-channel audio, parameters such as number of channels, sample rate, and/or compression, may be adjusted prior to delivery to the device. Subsequent to step 408, the exemplary steps may advance to step 410. In step 410, the processed multimedia content may be delivered to the device, such as the devices 308, 310, and 312 of FIG. 3A, for which it has been suitably processed.

Aspects of a method and system for processing and delivery of multimedia content by an IFSTB device are provided. In an exemplary embodiment of the invention, an IFSTB device 306 may determine capabilities, preferences, and/or settings of each of one or more cellular enabled communication devices 308 and 310 in communication with the integrated femtocell and set-top-box device. The IFSTB device 306 may process multimedia content based on the determined capabilities, preferences, and/or settings, and communicate the processed multimedia content to the one or more cellular enabled communication devices based on the determined capabilities, preferences, and/or settings. The determined capabilities, preferences, and/or settings may comprise multimedia processing capabilities, preferences, and/or settings of each of the one or more cellular enabled communication devices. The multimedia processing capabilities, preferences, and/or settings may be determined, at least in part, by a hardware and/or software CODEC within the cellular enabled communication devices 308 and 310. The determined capabilities, preferences, and/or settings may comprise communication capabilities, preferences, and/or settings of each of the one or more cellular enabled communication devices. The communication capabilities, preferences, and/or settings may comprise a maximum data rate at which each of the one or more cellular enabled communication devices are operable to communicate with the IFSTB device. The determined capabilities, preferences, and/or settings may comprise power available in each of the cellular enabled communication devices 308 and 310 for processing the multimedia content. Processing of the multimedia content may convert it to a format suitable for each of the one or more cellular enabled communication devices 308 and 310. The content may be processed to generate a plurality of subset datastreams. Subset datastreams communicated to a particular one of the cellular enabled communication devices 308 and 310 may be based on the determined capabilities, preferences, and/or settings of that particular cellular communication device 308 or 310. Error coding utilized for processing and communicating the multimedia content to the cellular enabled communication devices 308 and 310 may be based on the determined capabilities, preferences, and/or settings.

In an exemplary embodiment of the invention, a cellular enabled communication device 308 (FIG. 3) may communicate its capabilities, preferences, and/or settings to an integrated femtocell and set-top-box device 306, wherein the integrated femtocell and set-top-box device 306 may process multimedia content for the cellular enabled communication device 308 based on the capabilities, preferences, and/or settings of the cellular enabled communication device 308. Additionally, the cellular enabled communication device 308 may receive the processed multimedia content from the integrated femtocell and set-top-box device 306 by the cellular enabled communication device 308. The capabilities, preferences, and/or settings may comprise multimedia processing capabilities, preferences, and/or settings, communication capabilities, preferences, and/or settings, and/or power conditions, preferences, and/or settings. The cellular enabled communication device 308 may store the multimedia content and present the multimedia content to a user. Multimedia processing capabilities, preferences, and/or settings may be determined based on a hardware and/or software codec within the cellular enabled communication device 308. Communication capabilities, preferences, and/or settings may be determined based on a minimum and/or maximum data rate at which the cellular enabled communication device 308 may be operable to communicate. The integrated femtocell and set-top-box device 306 may be operable to convert the multimedia content to a format suitable for the cellular enabled communication device 308. The integrated femtocell and set-top-box device 306 may process the multimedia content to generate a plurality of subset datastreams. One or more subset datastreams may be communicated to the cellular enabled communication device 308 based on the determined capabilities, preferences, and/or settings. The integrated femtocell and set-top-box device 306 may determine error coding to utilize for processing and communicating the multimedia content to the cellular enabled communication device 308 based on the determined capabilities, preferences, and/or settings.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for processing and delivery of multimedia content by an integrated femtocell and set-top-box device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
    establishing one or more cellular communication channels between an integrated femtocell and set-top-box device and a cellular enabled communication device;
    receiving a datastream comprising multimedia content by the integrated femtocell and set-top-box device via a broadband connection;
    processing the datastream comprising multimedia content to generate a plurality of scalable subset datastreams, said processing based on characteristics of the one or more cellular communication channels and wherein one of the plurality of scalable subset datastreams is differentiated from the datastream based on a datastream quality; and
    communicating at least two of said plurality of scalable subset datastreams from said integrated femtocell and set-top-box device to said cellular enabled communication device.

2. The method according to claim 1, wherein the processing further includes adjusting at least one of resolution, frame rate, compression, and color depth of the multimedia content prior to communicating said at least two of said plurality of scalable subset datastreams.

3. The method according to claim 1, wherein the processing further includes adjusting at least one of a number of channels, sample rate, and compression of the multimedia content prior to communicating said at least two of said plurality of scalable subset datastreams.

4. The method according to claim 1, wherein the processing is further based on information identifying a hardware and/or software CODEC within said cellular enabled communication device.

5. The method according to claim 1, wherein the processing is further based on a minimum data rate and/or a maximum data rate at which said cellular enabled communication device is configured to communicate with said integrated femtocell and set-top-box device.

6. The method according to claim 1, wherein the processing is further based on determining power available for processing of said multimedia content by said cellular enabled communication device.

7. The method according to claim 1, wherein the processing further includes converting said multimedia content to a format suitable for said cellular enabled communication device.

8. The method according to claim 1, wherein the number of said plurality of scalable subset datastreams communicated to said cellular enabled communication device is determined based on determined capabilities, preferences, and/or settings of said cellular enabled communication device.

9. The method according to claim 8, wherein the processing is further based on said determined capabilities, preferences, and/or settings of said cellular enabled communication device.

10. The method according to claim 1, wherein the processing further includes using error coding based on determined capabilities, preferences, and/or settings of said cellular enabled communication device.

11. The method according to claim 1, wherein the processing further includes generating said plurality of scalable subset datastreams that comprises a customized electronic programming guide based on capabilities, preferences, and/or settings of said cellular enabled communication device.

12. The method according to claim 1, wherein the processing further includes using a user profile associated with said cellular enabled communication device that indicates capabilities, preferences, and/or settings of said cellular enabled communication device.

13. The method according to claim 1, wherein the datastream quality comprises at least one of a temporal resolution, a spatial resolution, a frame rate, and a color depth.

14. The method according to claim 1, wherein the plurality of scalable subset datastreams includes a first subset datastream and a second subset datastream, the first subset datastream having a first datastream quality and the second subset datastream having a second datastream quality, wherein the second datastream quality exceeds the first datastream quality.

15. The method according to claim 1, wherein the plurality of scalable subset datastreams cumulatively result in a higher quality datastream at said cellular enabled communication device.

16. A system for networking, the system comprising:
    one or more circuits for use in an integrated femtocell and set-top-box device, wherein said one or more circuits are configured to:
    establish one or more cellular communication channels between the integrated femtocell and set-top-box device and a cellular enabled communication device;
    receive a datastream comprising multimedia content by the integrated femtocell and set-top-box device via a broadband connection;
    process the datastream comprising multimedia content to generate a plurality of scalable subset datastreams, said processing based on characteristics of the one or more cellular communication channels and wherein one of the plurality of scalable subset datastreams is differentiated from the datastream based on a datastream quality; and communicate at least two of said subsequent datastreams from said integrated femtocell and set-top-box device to said cellular enabled communication device.

17. The system according to claim 16, wherein said one or more circuits are further configured to adjust at least one of resolution, frame rate, compression, and color depth of the multimedia content prior to communicating said at least two of said plurality of scalable subset datastreams.

18. The system according to claim 16, wherein said one or more circuits are further configured to adjust at least one of a number of channels, sample rate, and compression of the multimedia content prior to communicating said at least two of said plurality of scalable subset datastreams.

19. The system according to claim 16, wherein said one or more circuits are further configured to process based on information identifying a hardware and/or software CODEC within said cellular enabled communication device.

20. The system according to claim 16, wherein said one or more circuits are further configured to process based on a minimum data rate and/or a maximum data rate at which said cellular enabled communication device is configured to communicate with said integrated femtocell and set-top-box device.

21. The system according to claim 16, wherein said one or more circuits are further configured to process based on determining power available for processing of said multimedia content by said cellular enabled communication device.

22. The system according to claim 16, wherein said one or more circuits are further configured to convert said multimedia content to a format suitable for said cellular enabled communication device.

23. The system according to claim 16, wherein the number of said plurality of scalable subset datastreams communicated to said cellular enabled communication device is determined based on determined capabilities, preferences, and/or settings of said cellular enabled communication device.

24. The system according to claim 23, wherein said one or more circuits are further configured to process based on said determined capabilities, preferences, and/or settings of said cellular enabled communication device.

25. The system according to claim 16, wherein said one or more circuits are further configured to process using error coding based on determined capabilities, preferences, and/or settings of said cellular enabled communication device.

26. The system according to claim 16, wherein said one or more circuits are further configured to generate said plurality of scalable subset datastreams that comprises a customized electronic programming guide based on capabilities, preferences, and/or settings of said cellular enabled communication device.

27. The system according to claim 16, wherein said one or more circuits are further configured to process using a user profile associated with said cellular enabled communication device that indicates capabilities, preferences, and/or settings of said cellular enabled communication device.

28. The system according to claim 16, wherein the datastream quality comprises at least one of a temporal resolution, a spatial resolution, a frame rate, and a color depth.

29. The system according to claim 16, wherein the plurality of scalable subset datastreams includes a first subset datastream and a second subset datastream, the first subset datastream having a first datastream quality and the second subset datastream having a second datastream quality, wherein the second datastream quality exceeds the first datastream quality.

30. The system according to claim 16, wherein the plurality of scalable subset datastreams cumulatively result in a higher quality datastream at said cellular enabled communication device.

* * * * *